(12) United States Patent
Oguri et al.

(10) Patent No.: US 12,448,047 B2
(45) Date of Patent: Oct. 21, 2025

(54) DEVICE PROTECTION STRUCTURE OF VEHICLE BODY

(71) Applicant: Honda Motor Co., Ltd., Tokyo (JP)

(72) Inventors: Masayuki Oguri, Tokyo (JP); Takuya Inazumi, Tokyo (JP); Hajime Kusumoto, Tokyo (JP); Jin Tomita, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 332 days.

(21) Appl. No.: 18/165,326

(22) Filed: Feb. 7, 2023

(65) Prior Publication Data
US 2023/0303176 A1    Sep. 28, 2023

(30) Foreign Application Priority Data
Mar. 24, 2022 (JP) ................. 2022-049168

(51) Int. Cl.
*B62D 21/15* (2006.01)
*B62D 21/11* (2006.01)
*B62D 25/20* (2006.01)

(52) U.S. Cl.
CPC ........... *B62D 21/15* (2013.01); *B62D 21/11* (2013.01); *B62D 25/20* (2013.01)

(58) Field of Classification Search
CPC ........ B62D 21/15; B62D 21/11; B62D 25/20; B62D 21/155; B62D 21/157
See application file for complete search history.

(56) References Cited

U.S. PATENT DOCUMENTS

| | | | |
|---|---|---|---|
| 2009/0021052 A1* | 1/2009 | Kato | B62D 21/155 296/203.01 |
| 2013/0026797 A1 | 1/2013 | Onodera et al. | |
| 2013/0270861 A1* | 10/2013 | Young | B62D 21/15 296/187.09 |
| 2018/0361857 A1 | 12/2018 | Shimizu | |
| 2019/0232895 A1 | 8/2019 | Yamada et al. | |

FOREIGN PATENT DOCUMENTS

| | | |
|---|---|---|
| CN | 102822041 | 12/2012 |
| CN | 109131561 | 1/2019 |
| CN | 110103692 | 8/2019 |
| CN | 110171477 | 8/2019 |
| JP | H07246842 | 9/1995 |
| JP | 2018140711 | 9/2018 |
| JP | 2020132132 | 8/2020 |
| JP | 2020173918 | 10/2020 |
| WO | 2018207689 | 11/2018 |

OTHER PUBLICATIONS

"Office Action of China Counterpart Application", with English translation thereof, issued on Aug. 15, 2025, pp. 1-17.

* cited by examiner

*Primary Examiner* — Lori Lyjak
(74) *Attorney, Agent, or Firm* — JCIPRNET (57) ABSTRACT

A slider member (30), at least covering a front surface part of a protection target device (40) disposed under a floor of a vehicle body (1) behind a sub-frame (20); and an installation member (50), disposed behind a rear end part (22) of the sub-frame (20) and installing the slider member (30) to the vehicle body (1) are provided. The slider member (30) has an inclined surface (31a) facing a front of the vehicle body (1) and inclined rearward and downward of the vehicle body (1). The installation member (50) has a reinforcement surface (51) formed at an inclination angle same as the inclined surface (31a) and abutting against the inclined surface (31a) from behind.

20 Claims, 7 Drawing Sheets

Enlarged Y

DEVICE PROTECTION STRUCTURE OF VEHICLE BODY

CROSS-REFERENCE TO RELATED APPLICATION

This application claims the priority benefit of Japan application serial No. 2022-049168, filed on Mar. 24, 2022. The entirety of the above-mentioned patent application is hereby incorporated by reference herein and made a part of this specification.

BACKGROUND

Technical Field

The disclosure relates to a device protection structure of a vehicle body for protecting a device mounted in a vehicle when the vehicle is collided.

Description of Related Art

As an example, Patent Document 1 discloses a structure as a device protection structure for protecting a device mounted in a vehicle when the vehicle is collided.

In the vehicle disclosed in Patent Document 1, a sub-frame is provided at the lower part of a vehicle body member on the front side, and a high voltage battery, which is the protection target device, is installed to the lower part of a center floor located on the rear side of the sub-frame. In addition, a reinforcement structure for protecting the high voltage battery at the time when the front of the vehicle is collided is provided to be located at the rear of the sub-frame and the front part of the high voltage battery. In addition, the front surface of the reinforcement structure is formed as an inclined surface inclined toward the rear side. Accordingly, in the event of a vehicle collision, the inclined surface guides the sub-frame to move downward, thereby preventing the sub-frame from directly colliding with the front part of the high voltage battery.

PRIOR ART DOCUMENTS

Patent Documents

[Patent Document 1] Japanese Laid-open No. 2020-132132

However, in the conventional structure disclosed in Patent Document 1, the inclined surface of the reinforcement structure for guiding the sub-frame downward is simply formed so that the surface of a portion of the reinforcement structure with a hollow closed section structure is inclined rearward. Therefore, the strength against the collision of the sub-frame may be insufficient. Thus, there is a concern that the inclined surface may be deformed due to collision of the sub-frame and unable to guide the sub-frame downward. As a result, the high voltage battery may be damaged.

SUMMARY

An aspect of the disclosure provides a device protection structure of a vehicle body. The device protection structure includes: a side frame, extending in a front-rear direction of the vehicle body at a side part of an engine room; a sub-frame, installed to a lower part of the side frame and supporting a suspension member; and a protection target device, disposed under a floor of the vehicle body behind the sub-frame. The device protection structure includes: a slider member, covering at least a front surface part of the protection target device; and an installation member, disposed behind a rear end part of the sub-frame and installing the slider member to the vehicle body. The slider member has an inclined surface facing a front of the vehicle body and inclined rearward and downward of the vehicle body, and the installation member has a reinforcement surface formed at an inclination angle same as the inclined surface and abutting against the inclined surface from behind.

DESCRIPTION OF THE EMBODIMENTS

A device protection structure of a vehicle body according to the disclosure includes: a side frame (10), extending in a front-rear direction of the vehicle body (1) at a side part of an engine room (A); a sub-frame (20), installed to a lower part of the side frame (10) and supporting a suspension member; and a protection target device (40), disposed under a floor of the vehicle body (1) behind the sub-frame (20). The device protection structure includes: a slider member (30), covering at least a front surface part of the protection target device (40); and an installation member (20), disposed behind a rear end part (22) of the sub-frame (20) and installing the slider member (30) to the vehicle body (1). The slider member (30) has an inclined surface (31*a*) facing a front of the vehicle body (1) and inclined rearward and downward of the vehicle body (1), and the installation member (50) has a reinforcement surface (51) formed at an inclination angle same as the inclined surface (31*a*) and abutting against the inclined surface (31*a*) from behind.

According to the device protection structure of the vehicle body according to the disclosure, when the front of the vehicle is collided, with the rear end part of the sub-frame which moves rearward abutting against the inclined surface of the slider member, the sub-frame that moves rearward can be guided downward along the inclined surface of the slider member. Accordingly, the protection target device can be prevented from contacting the sub-frame, and damages to the protection target device can be prevented. In particular, since the inclined surface is reinforced by the reinforcement surface of the installation member abutting against the inclined surface of the slider member from behind, the deformation or positional deviation generated at the inclined surface due to the contact (collision) of the sub-frame can be effectively prevented. Therefore, since the sub-frame can be stably guided downward, it is possible to reliably protect the protection target device.

In addition, in the device protection structure, it may also be that the rear end part (22) of the sub-frame (20) includes left and right extension parts extending rearward of a central part on two sides in a vehicle width direction, the slider member (30) includes: side walls (31A), inclined rearward and downward of the vehicle body (1) on the two sides in the vehicle width direction; a central wall (31B), protruding downward of the side walls (31A) at a center in the vehicle width direction; and vertical walls (32), connecting stepped portions between the side walls (31A) and the central wall (31B) in the vehicle width direction, lower surfaces (31A) of the side walls are the inclined surfaces (31a), and between a floor part of the vehicle body (1) and the central wall (31B), a cable (45) extending toward the engine room (A) from the protection target device (40) through a central part of the vehicle width direction is arranged.

According to the configuration, the slider member has the central wall protruding downward of the side walls, so the cable arrangement space for arranging the cable can be formed between the floor part of the vehicle body and the central wall, and the cable arranged in the cable arrangement space can be protected by the central wall and the vertical walls. Thus, the sub-frame that retreats during a vehicle collision can be effectively prevented from contacting the cable. Moreover, in the slider member, by disposing the side walls behind the left and right extension parts of the sub-frame and reinforcing the side walls by using the installation member, the cable arrangement space formed by the central wall can guide the sub-frame downward before being crushed. Moreover, since the stepped portions between the side walls and the central wall are connected by the vertical walls, even if the sub-frame tilts leftward or rightward and retreats, it is possible to reliably guide the sub-frame downward by using the vertical walls of the stepped parts, and the cable arrangement space can be reliably prevented from being intruded by the sub-frame.

In addition, in the device protection structure, it may also be that the slider member (30) has a bottom protection part (34) extending rearward of the vehicle body (1) from a lower end part (33) of the inclined surface (31a).

According to the configuration, since the slider member has the bottom protection part extending rearward of the vehicle from the lower end part of the inclined surface, even in the case where the sub-frame guided downward along the inclined surface moves rearward over the position of the lower end part of the inclined surface, the sub-frame can be prevented from contacting the protection target device.

In addition, in the device protection structure, it may also be that a lower end part (33) of the inclined surface (31a) of the slider member (30) extends downward of a lower end part (43) of the protection target device (40).

According to the configuration, since the lower end part of the inclined surface of the slider member extends downward of the lower end part of the protection target device, it is possible to guide the sub-frame that retreats during a vehicle collision downward of the lower end part of the protection target device. Therefore, the sub-frame that retreats can be reliably prevented from contacting the protection target device.

In addition, in the device protection structure, it may also be that an upper end part (51a) of the reinforcement surface (51) is located above an upper surface (22a) of the rear end part (22) of the sub-frame (20), and a lower end part (51b) of the reinforcement surface (51) is located lower than a lower surface (22b) of the rear end part (22) of the sub-frame (20).

According to the configuration, since the upper end part of the reinforcement surface of the installation member is located above an upper surface of the rear end part of the sub-frame, and the lower end part thereof is located lower than the lower surface of the rear end part of the sub-frame, the rear end part of the sub-frame that moves rearward abuts against the installation member (the portion reinforced by the installation member on the inclined surface) without passing the installation member, and the load from the sub-frame that moves rearward can be reliably received by the installation member. Accordingly, the deformation of the inclined surface of the slider member can be suppressed, so it is possible to stably guide the sub-frame that moves rearward downward.

In addition, in the device protection structure, the installation member (50) may be a solid member.

According to the configuration, since the installation member is a solid member, the inclined surface of the slider member can be firmly reinforced by the installation member, and the occurrence of deformation or position deviation of the inclined surface of the slider member that receives the load from the sub-frame can be effectively prevented.

In addition, in the device protection structure, it may also be that the device protection structure includes a floor frame (12) having a structure including a closed section (12b) and extending in the front-rear direction of the vehicle, and the installation member (50) is installed to the vehicle body (1) via the floor frame (12).

According to the configuration, the installation member is installed to the vehicle body side via a floor frame that is a strong frame member forming the closed section, so the detachment of the installation member installed to the vehicle body side or damage of the installation position due to the load when the sub-frame that retreats at the time when the front of the vehicle is collided abuts against the inclined surface of the slider member can be effectively prevented. In addition, since the load can be distributed in a wide range by the floor frame extending in the front-rear direction of the vehicle, the load of the sub-frame that retreats can be firmly received, and the sub-frame can be guided downward.

In addition, in the device protection structure, it may also be that wherein the protection target device is a high voltage unit (40) mounted in a vehicle, and the cable (45) is a power cable connected to a power source in the engine room (A) from the high voltage unit (40).

According to the configuration, the protection target device is the high voltage unit mounted in the vehicle. Therefore, the high voltage unit can be disposed under the floor of the vehicle body to optimize the layout, and the contact of the sub-frame that retreats when the front surface of the vehicle is collided to the high voltage unit or the power table can be reliably avoided, so the safety of the vehicle can be facilitated.

The numbers in parentheses above refer to the reference numbers of corresponding components of the drawings in the embodiments described below.

According to the device protection structure of the vehicle body according to the disclosure, by using a simple structure, the sub-frame that retreats when the front of the vehicle is collided can be stably guided downward, and it is possible to effectively protect the protection target device, such as a high voltage unit.

In the following, the embodiments of the disclosure are described in detail with reference to the drawings. The expressions "front", "rear" in the following description respectively refers to the front side, which is the advancing direction of the vehicle body (vehicle) to be described afterwards, and the rear side, which is the retreating direction of the vehicle body (vehicle) to be described afterwards. In addition, the expressions "upper", "lower", "left" and "right" respectively indicate upper, lower, left, and right when the vehicle body (vehicle) faces toward the advancing direction (front side).

Figure 1:
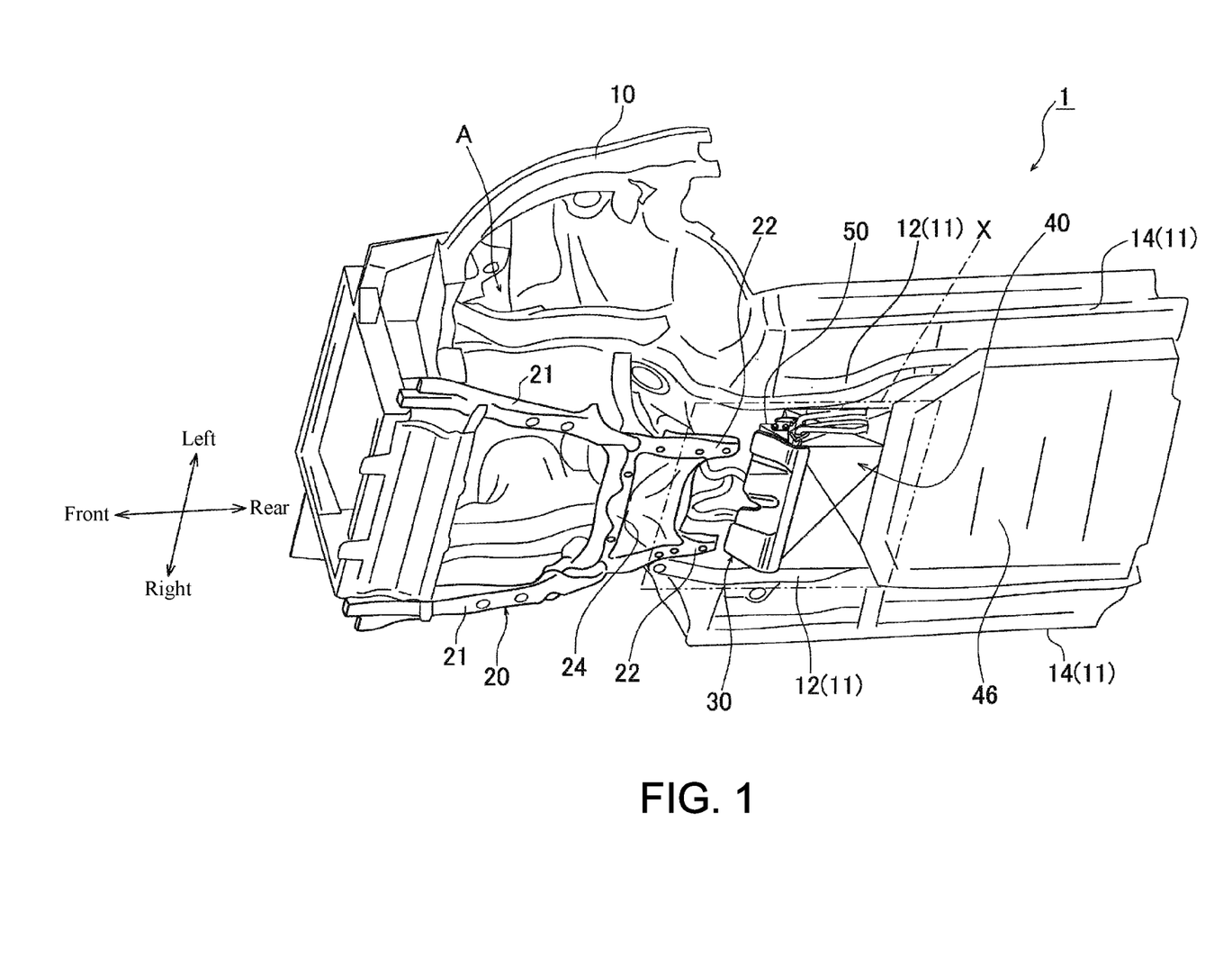
FIG. 1 is a schematic perspective view illustrating a vehicle body including a device protection structure according to an embodiment of the disclosure, when viewed from the bottom.
Figure 2:
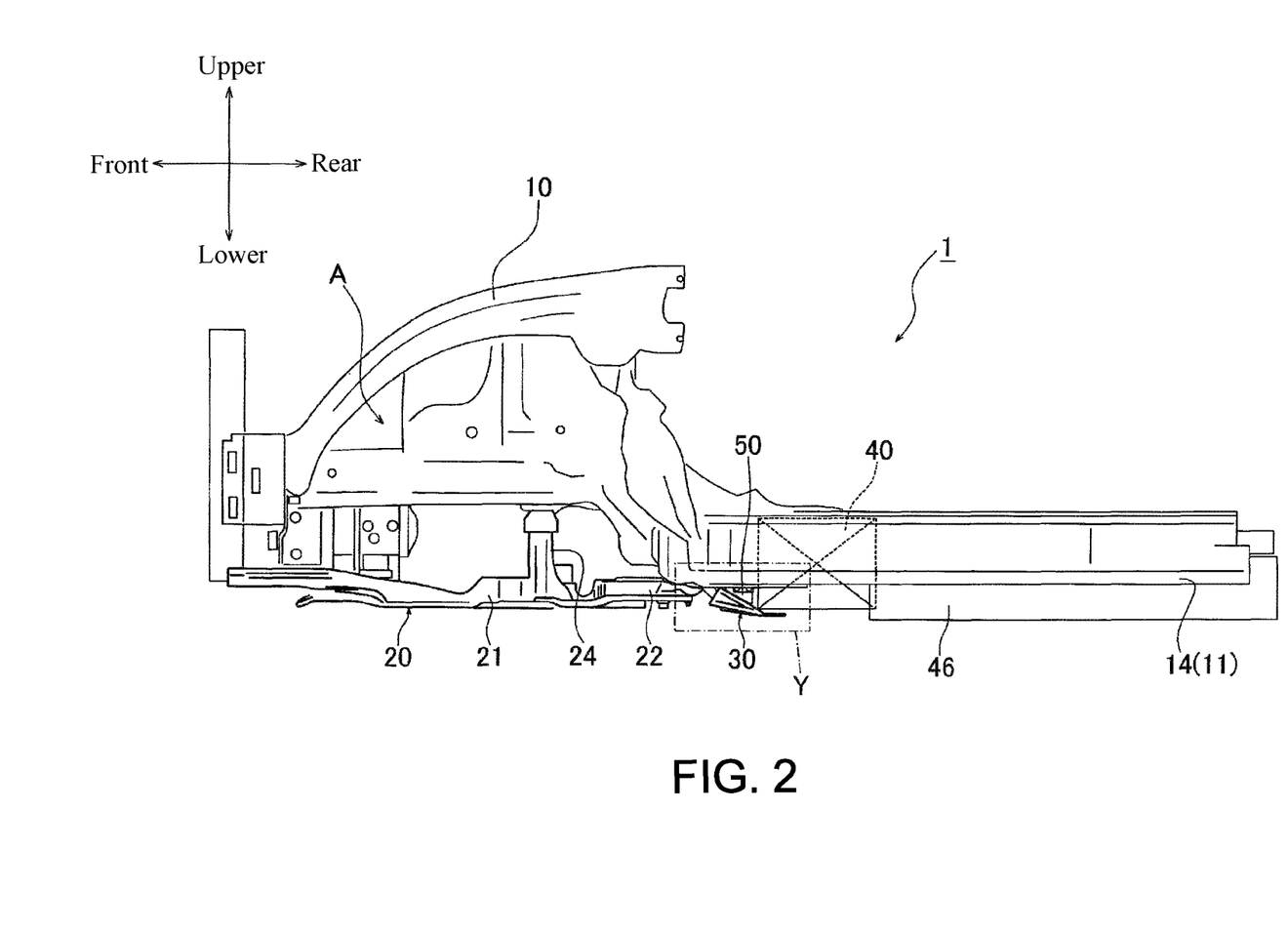
FIG. 2 is a schematic side view illustrating the vehicle body including the device protection structure according to an embodiment.

FIGS. 1 and 2 are schematic views illustrating a vehicle body including a device protection structure according to an embodiment of the disclosure. FIG. 1 is a perspective view when the vehicle body is viewed from the lower side. FIG. 2 is a side view when the vehicle body is viewed from a lateral side. A vehicle body 1 shown in the figures includes: a front side frame (side frame) 10 extending in the front-rear direction of the vehicle body 1 at a side part of an engine room A provided at the front part of the vehicle; and a sub-frame 20 installed to the lower part of the front side frame 10 and supporting a suspension member (not shown).

In addition, a base frame 11 is installed to the rear side of the front side frame 10. The base frame 11 includes: a pair of left and right floor frames 12 connected to the rear side of the front side frame 10 and extending in the front-rear direction; and a pair of left and right side sills 14 disposed on vehicle width outer sides (specifically, the outer side ends of the base frame 11 in the vehicle width direction) with respect to the left and right front frames 12 and extending in the front-rear direction.

The sub-frame 20 includes: a pair of left and right side members 21, 21 extending along the front-rear direction; and a cross member 24 extending along the vehicle width direction to respectively connect the front edge parts of the two side members 21, 21 with the rear edge parts, and the sub-frame 20 as a whole is formed in an grid shape. The rear end sides of the pair of left and right side members 21, 21 serve as extension parts 22, 22 extending rearward of the central part of the sub-frame 20 in the vehicle width direction. That is, in the rear end part of the sub-frame 20, the two sides (left and right sides) in the vehicle width direction serve as the extension parts 22, 22 respectively extending rearward, and the inner sides of the extension parts 22, 22 (inner sides in the vehicle width direction) are formed in a concave shape recessed forward.

In addition, a high voltage unit (high voltage control apparatus unit) 40 that is a protection target device is disposed under the floor of the vehicle body 1 (under the floor of the passenger compartment) behind the sub-frame 20. Although the detailed illustration is omitted, the high voltage unit 40 is a unit including a battery module mounted in the vehicle, a high voltage device for controlling power transmission and reception of the battery module and a power distributor, and a main switch for the battery module, etc. A cover member 46 covering the lower surface of the high voltage unit 40 is installed to the lower surface side of the rear side of the high voltage unit 40 excluding the front surface part. The cover member 46 is a member made of synthetic resin and having a substantially plate shape.

Figure 3:
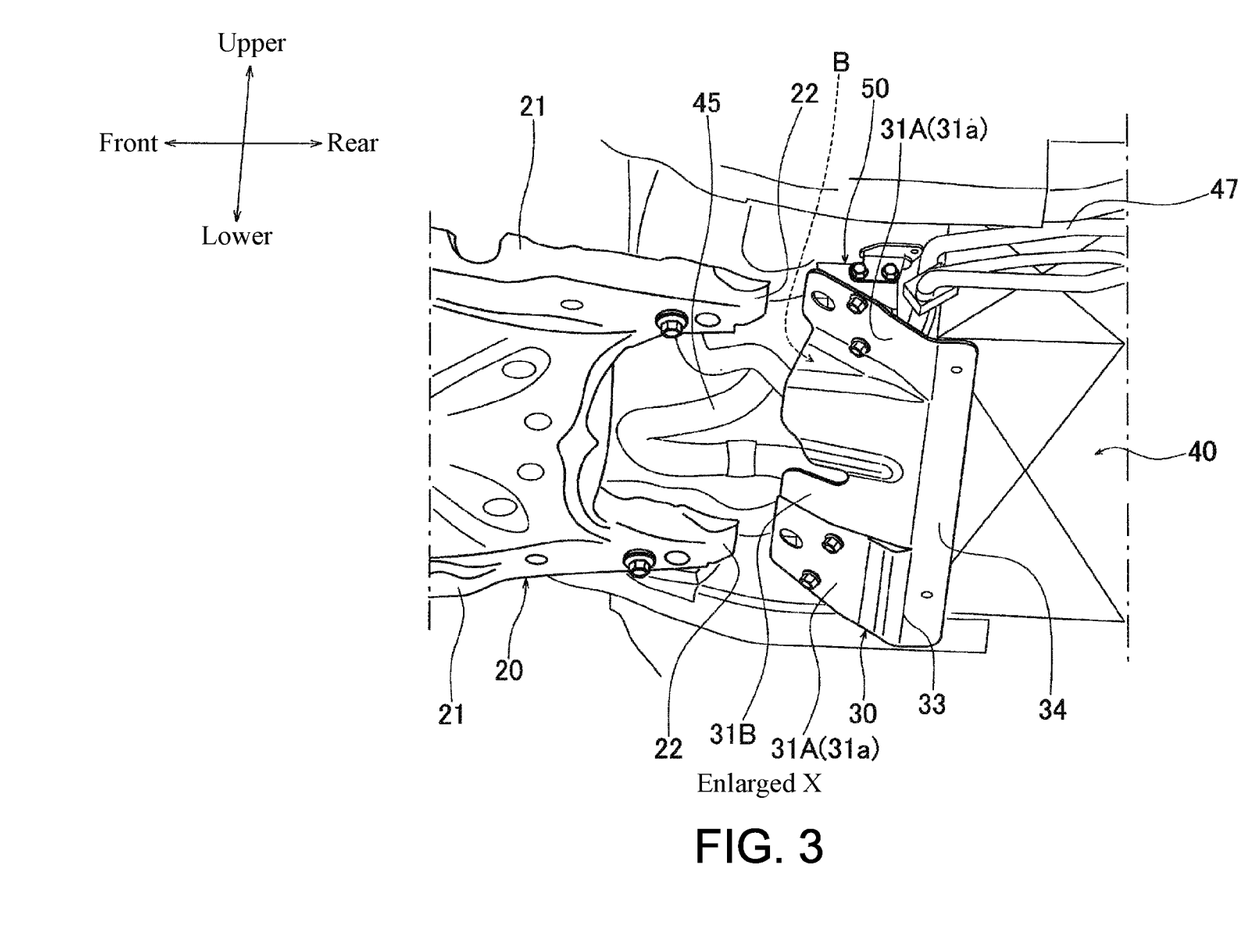
FIG. 3 is a partially enlarged view of a portion X of FIG. 1.
Figure 4:
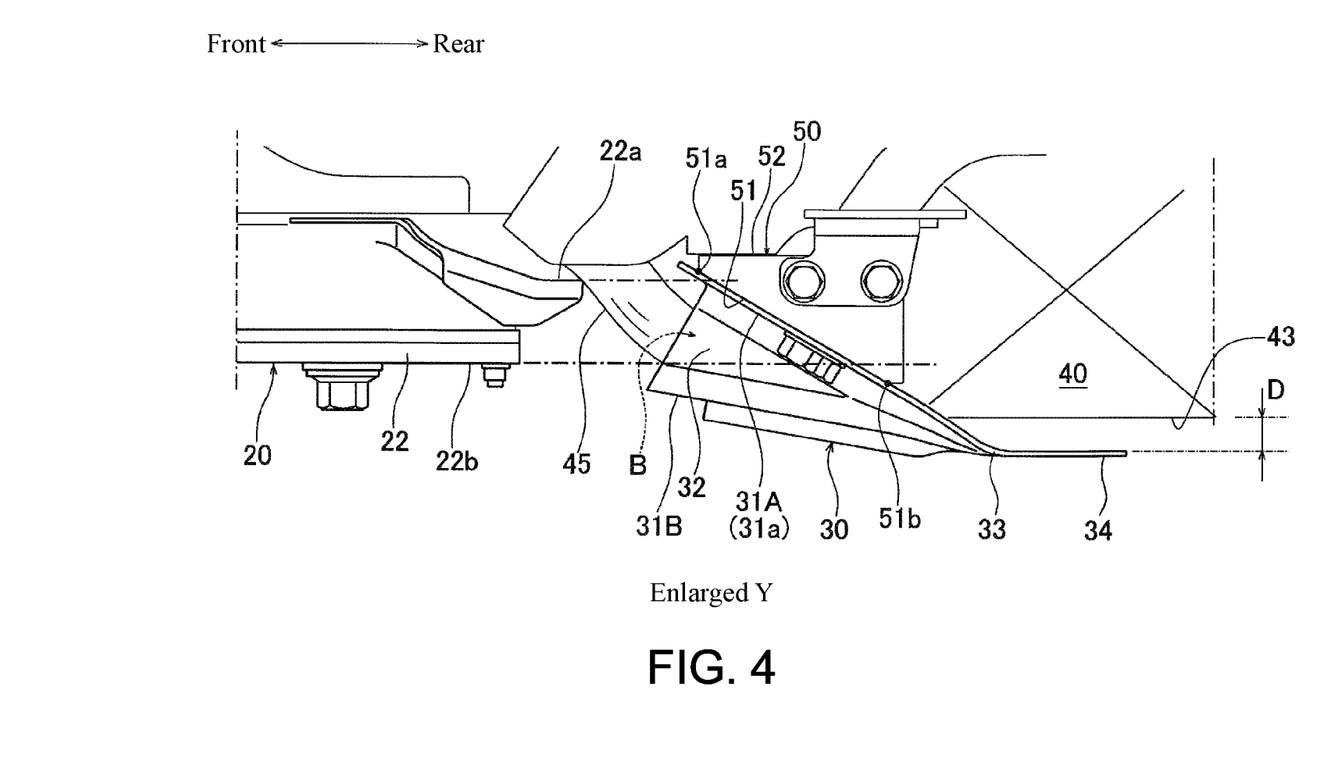
FIG. 4 is a partially enlarged view of a portion Y of FIG. 2.

FIG. 3 is a partially enlarged view of a portion X of FIG. 1. In addition, FIG. 4 is a partially enlarged view of a portion Y of FIG. 2. As shown in the figures, a slider plate (slider member) 30 covering the front surface part of the high voltage unit 40 is provided. The slider plate 30 is a metal plate-shaped member and disposed to cover the front side and the lower side of the front end part of the high voltage unit 40, and includes an inclined wall 31 (31A, 31B) inclined rearward and downward of the vehicle body 1. The inclined wall 31 of the slider plate 30 is provided with a pair of side inclined walls (side walls) 31A formed respectively behind the pair of extension parts 22, 22 of the sub-frame 20 and a central inclined wall (central wall) 31B protruding downward (vehicle outward direction) of the side inclined walls 31A at the central part in the vehicle width direction. By making the inclination angle of the side inclined walls 31A steeper than that of the central inclined wall 31B, the central inclined wall 31B is disposed at a lower position (position on the lower side) than the side inclined walls 31A. In addition, the stepped portion between each of the left and right side inclined walls 31A and the two sides of the central inclined wall 31B in the vehicle width direction is connected by a vertical wall 32 extending in the upper-lower direction. That is, in the vehicle width direction, the central inclined wall 31B and the side inclined walls 31A are connected via stepped differences. Then, as described in the following, the lower surfaces of the side inclined walls 31A serve as inclined surfaces 31a abutting against the pair of extension parts 22, 22 of the sub-frame 20 that retreats.

Figure 5:
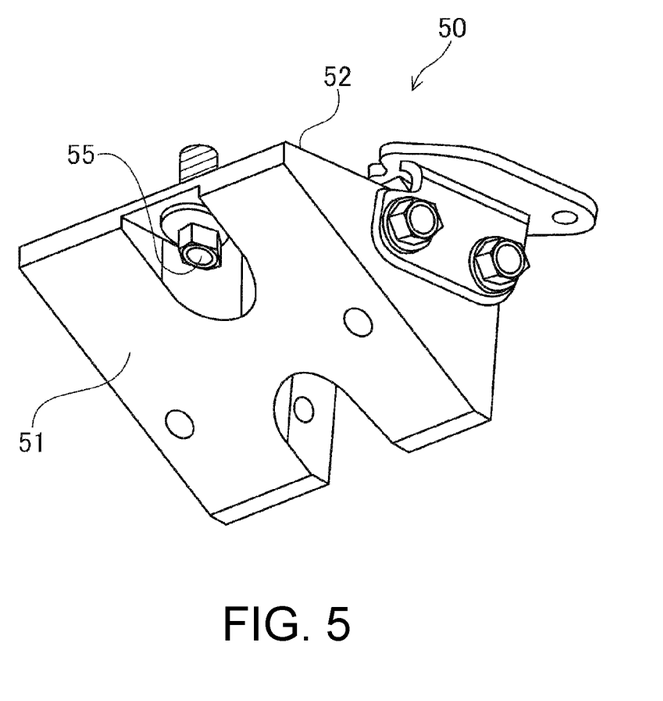
FIG. 5 is a view illustrating an installation member.

The slider plate 30 is installed to the vehicle body 1 by using a pair of installation members 50, 50. FIG. 5 is a view illustrating the installation member 50. As shown in the same figure, the installation member 50 is a solid member with a cross-sectional surface in a substantially triangular shape, and includes a lower installation surface (reinforcement surface) 51 installed to the slider plate 30 and an upper installation surface 52 installed to the vehicle body 1 via the floor frame 12 to be described afterwards. As shown in FIG. 4, the lower installation surface 51 is formed with the same inclination angle as the side inclined wall 31A. The lower installation surface 51 serves as a reinforcement surface that reinforces the side inclined wall 31A from the back surface (behind) by abutting against the back surface (behind) of the side inclined wall 31A.

As shown in FIG. 3, a support member 47 supporting the high voltage unit 40 may also be installed to the installation member 50. Although detailed illustration is omitted, the support member 47 is a frame-shaped member that suspends and supports the high voltage unit 40. The support member 47 is installed to the side of the vehicle body 1 only via the installation member 50. That is, the high voltage unit 40 is installed to the vehicle body 1 via the support member 47 and the installation member 50.

Moreover, as shown in FIG. 3, a high voltage cable (cable) 45 extending from the high voltage unit 40 toward an engine room A through the central part in the vehicle width direction is provided. The high voltage cable 45 is arranged in a space (cable arrangement space) B formed between the central inclined wall 31B of the slider plate 30 and the floor part of the vehicle body 1.

As shown in FIG. 4, the lower end parts (rear end parts) 33 of the side inclined walls 31A and the central inclined wall 31B of the slider plate 30 extend downward of a lower end part (lower surface) 43 of the high voltage unit 40. Accordingly, the lower end parts 33 of the side inclined walls 31A and the central inclined wall 31B of the slider plate 3 are located lower than the lower end part 43 of the high voltage unit 40. In addition, the slider plate 30 is provided with a bottom protection wall (bottom protection part) 34 extending (substantially parallel to the base frame 11) from the lower end parts 33 of the side inclined walls 31A and the central inclined wall 31B toward the rear of the vehicle body 1. Since the lower ends 33 of the side inclined walls 31A and the central inclined wall 31B are located lower than the lower end part 43 of the high voltage unit 40, the bottom protection wall 34 is a eaves-shaped portion extending toward the rear side of the vehicle body 1 at a position lower than the lower end part 43 of the high voltage unit 40. Therefore, a gap D in the upper-lower direction is formed between the lower end parts 33 of the side inclined walls 31A and the central inclined wall 31B as well as the bottom protection wall 34 and the lower end part 43 of the high voltage unit 40.

In addition, as shown in FIG. 4, an upper end part (front end part) 51a of the reinforcement surface 51 of the installation member 50 is located above upper surface 22a of the extension part 22 of the sub-frame 20, and a lower end part (rear end part) 51b of the reinforcement surface 51 of the installation member 50 is located lower than a lower surface 22b of the extension part 22 of the sub-frame 20.

Figure 6:
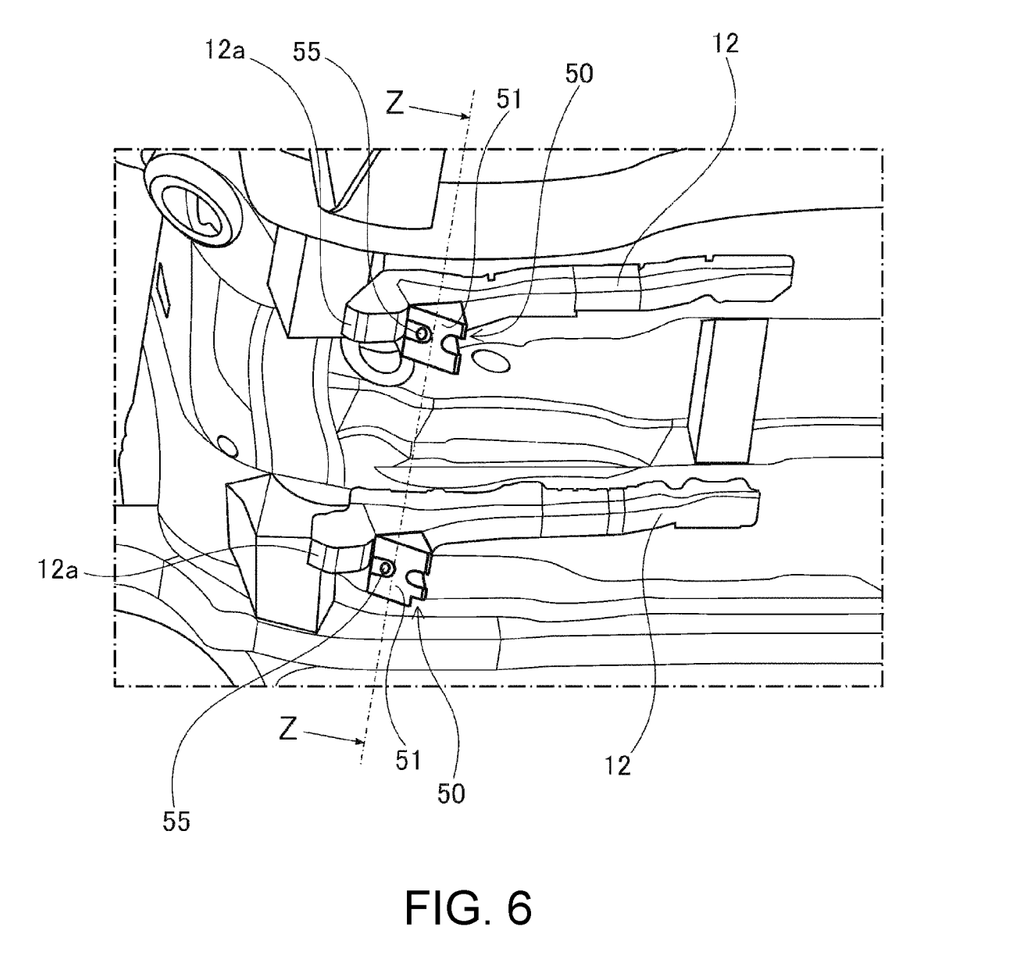
FIG. 6 is a view illustrating the installation member installed to a vehicle body side when the vehicle body is viewed from a lower surface side.
Figure 7:
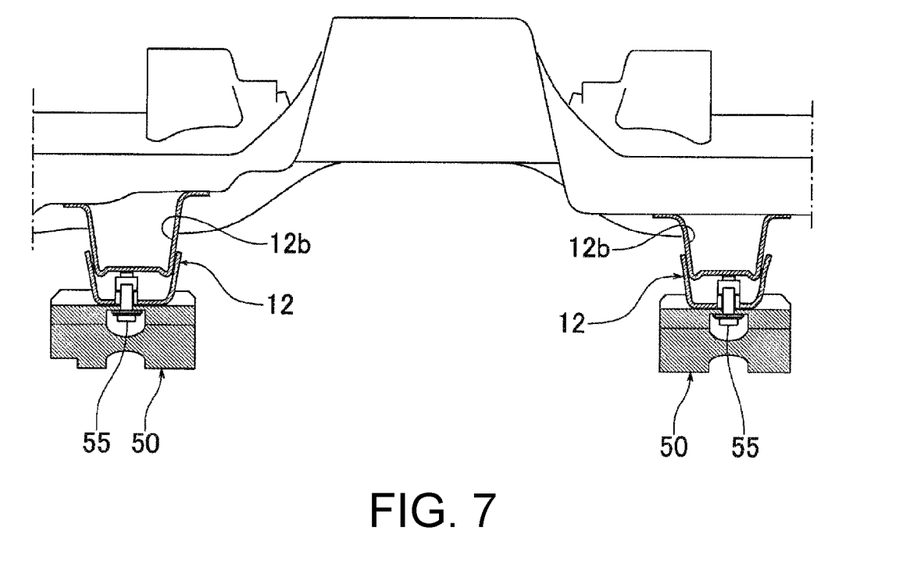
FIG. 7 is a schematic view illustrating a cross section taken along Z-Z of FIG. 6.

FIG. 6 is a view illustrating the installation member installed to a vehicle body side when the vehicle body is viewed from a lower surface side. FIG. 7 is a schematic view illustrating a cross section taken along Z-Z of FIG. 6. In FIG. 6, the slider plate 30 installed to the installation member 50 is omitted. In addition, the illustration of the high voltage unit 40 and the cover member 46 is also omitted. As shown in these figures, the installation member 50 is installed to the vehicle body 1 via the floor frame 12. The floor frame 12 is a structure having a closed section 12b in a substantially rectangular shape, and is an elongated member extending in the front-rear direction of the vehicle body 1. The entirety of the floor frame 12 in the longitudinal direction is installed under the floor of the vehicle body 1 to be supported. The installation member 50 is fixed to the lower surface of the floor frame 12 in the vicinity of a front end part 12a through fastening of a bolt (fastener) 55.

As described above, the vehicle body 1 according to the embodiment includes: the side frame 10 extending in the front-rear direction at the side part of the engine room A; the sub-frame installed to the lower part of the side frame 10 to support a suspension member; and the high voltage unit (protection target device) 40 disposed under the floor of the vehicle body 1 behind the sub-frame 20. In addition, as the protection structure for protecting the high voltage unit 40 during a vehicle collision, the slider plate (slider member) 30 having the inclined surfaces 31a covering the front surface part of the high voltage unit 40 and having the inclined surfaces 31a inclined rearward and downward of the vehicle body 1, and the installation member 50 installing the slider plate 30 to the vehicle body 1 are provided. The installation member 50 has the reinforcement surface 51 formed at the same inclination angle as the side inclined wall 31A (inclined surface 31a) of the slider plate 30 and abutting against the back surface side (behind) of the side inclined walls 31A.

According to the device protection structure of the vehicle body 1 according to the disclosure, when the front of the vehicle is collided, with the extension parts (rear end parts) 22 of the sub-frame 20 which moves rearward (retreats) abutting against the side inclined walls 31A (inclined surfaces 31a) of the slider plate 30, the sub-frame 20 that retreats can be guided downward along the side inclined walls 31A of the slider plate 30. Accordingly, the sub-frame 20 can be prevented from contacting the high voltage unit 40 as the protection target device, and damages to the high voltage unit 40 can be prevented. In particular, since the side inclined walls 31A are reinforced by the reinforcement surfaces 51 of the installation members 50 which abut against the side inclined walls 31A (inclined surfaces 31a) of the slider plate 30 from the back surface side (behind), the deformation or positional deviation generated at the side inclined walls 31A (inclined surfaces 31a) due to the contact (collision) of the sub-frame 20 can be effectively prevented. Therefore, since the sub-frame 20 can be stably guided downward, it is possible to reliably protect the high voltage unit 40.

In addition, in the embodiment, the rear end parts of the sub-frame 20 are the left and right extension parts 22 extending rearward of the central part on the two sides of the sub-frame in the vehicle width direction. The slider plate 30 includes: the side inclined walls (side walls) 31A inclined rearward and downward of the vehicle body 1 on the two sides in the vehicle width direction; the central inclined wall (central wall) 31B protruding downward of the side inclined walls 31A at the center of the vehicle width direction; and the vertical walls 32 connecting the stepped portions between the side inclined walls 31A and the central inclined wall 31B in the vehicle width direction. The lower surfaces (front surfaces) of the side inclined walls 31A serve as inclined surfaces receiving the sub-frame 20 that retreats. In addition, in the cable arrangement space B formed between the floor part of the vehicle body 1 and the central inclined wall 31B, the high voltage cable 45 extending toward the engine room A through the central part of the vehicle width direction from the high voltage unit 40 is arranged.

According to the configuration, since the slider plate 30 is provided with the central inclined wall 31B protruding downward of the side inclined walls 31A, the cable arrangement space B for arranging a cable can be formed between the floor part of the vehicle body 1 and the central inclined wall 31B (gap in the upper-lower direction), and it is possible to protect the high voltage cable 45 arranged in the cable arrangement space B against the sub-frame 20 that retreats during a vehicle collision by using the central inclined wall 31B. In addition, in the slider plate 30, by disposing the side inclined walls 31A having the inclined surfaces 31a behind the left and right extension parts 22 serving as the rear end parts of the sub-frame 20 and reinforcing the side inclined walls 31A by using the reinforcement surfaces 51 of the installation members 50, it is possible to guide the sub-frame 20 downward before the cable arrangement space B formed by the central inclined wall 31B is crushed. Moreover, since the stepped portions between the side inclined walls 31A and the central inclined wall 31B are connected by the vertical walls 32, even if the sub-frame 20 tilts leftward or rightward and retreats, it is possible to reliably guide the sub-frame 20 downward by using the vertical walls 32 of the stepped parts, and the cable arrangement space B can be prevented from being intruded by the sub-frame 20 (extension parts 22).

In addition, in the embodiment, the slider plate 30 has the bottom protection wall (bottom protection part) 34 extending from the lower ends 33 of the inclined surfaces 31a toward the rear of the vehicle body 1.

According to the configuration, even in the case where the sub-frame 20 guided downward along the inclined surfaces 31a moves rearward over the positions of the lower end parts 33 of the inclined surfaces 31a, the sub-frame 20 can be prevented from contacting the high voltage unit 40. Therefore, it is possible to effectively protect the high voltage unit 40.

In addition, in the embodiment, the lower end parts 33 of the inclined surfaces 31a of the slider plate 30 extend to positions lower than the lower end part 43 of the high voltage unit 40.

According to the configuration, it is possible to guide the sub-frame 20 that retreats during a vehicle collision to be lower than the lower end part 43 of the high voltage unit 40. Therefore, the sub-frame 20 that retreats can be reliably prevented from contacting the high voltage unit 40.

In addition, in the embodiment, the upper end part 51a of the reinforcement surface 51 of the installation member 50 is located above the upper surface 22a of the extension part 22 of the sub-frame 20, and the lower end part 51b of the reinforcement surface 51 is located lower than the lower surface 22b of the extension part 22 of the sub-frame 20.

According to the configuration, the extension parts 22 of the sub-frame 20 that move rearward abuts against the reinforcement surface 51 (the portion reinforced by the reinforcement surface in the inclined surfaces 31a of the slider plate 30) without passing the reinforcement surface 51 of the installation member 50. Therefore, the load from the sub-frame 20 that moves rearward can be reliably received by the installation member 50. Accordingly, it is possible to reliably suppress the deformation of the inclined surfaces 31a of the slider plate 30 and stably guide the sub-frame 20 that moves rearward downward.

In addition, in the embodiment, the installation member 50 is a solid member.

According to the configuration, since the installation member 50 is a solid member, the inclined surface 31a of the slider plate 30 can be firmly reinforced by the installation member 50, and the occurrence of deformation or position deviation of the inclined surface 31a of the slider plate 30 that receives the load from the sub-frame 20 can be effectively prevented.

Moreover, in the embodiment, the floor frame 12 having a structure provided with the closed section 12b and extending in the front-rear direction of the vehicle body 1 is provided, and the installation member 50 is installed to the vehicle body 1 via the floor frame 12.

According to the configuration, the detachment of the installation member 50 installed to the vehicle body 1 or damage of the installation position due to the load when the sub-frame 20 that retreats when the front of the vehicle is collided abuts against the inclined surface 31a of the slider plate 30 can be effectively prevented. In addition, since the load can be distributed in a wide range by the floor frame 12 extending in the front-rear direction, the load of the sub-frame 20 that retreats can be firmly received, and the sub-frame 20 can be guided downward.

In addition, in the device protection structure of the vehicle body according to the embodiment, the protection target device is the high voltage unit 40 mounted in the vehicle. Therefore, the high voltage unit 40 can be disposed under the floor of the vehicle body 1 to optimize the layout of the vehicle, the collision of the sub-frame 20 that retreats when the front surface of the vehicle is collided to the high voltage unit 40 or the high voltage table 45 can be reliably avoided, and the safety of the vehicle can be facilitated.

Although the embodiments of the disclosure have been described above, the disclosure is not limited to the embodiments, and various modifications can be made within the scope of the technical ideas described in the claims, the specification and the drawings. For example, in the embodiment, the protection target device is the high voltage unit. However, the protection target device in the device protection structure of the vehicle body according to the disclosure is not limited to the high voltage unit, but may also be other devices.

Moreover, in the embodiment, the slider plate 30 (slider member) covers only the front surface side of the high voltage unit 40 that is the protection target device. However, the slider plate 30 may also cover other portions as long as at least a portion of the front surface side is covered.

What is claimed is:

1. A device protection structure of a vehicle body, the device protection structure comprising:
    a side frame, extending in a front-rear direction of the vehicle body at a side part of an engine room;
    a sub-frame, installed to a lower part of the side frame and supporting a suspension member; and
    a protection target device, disposed under a floor of the vehicle body behind the sub-frame,
    wherein the device protection structure comprises:
    a slider member, covering at least a front surface part of the protection target device; and
    an installation member, disposed behind a rear end part of the sub-frame and installing the slider member to the vehicle body,
    wherein the slider member has an inclined surface facing a front of the vehicle body and inclined rearward and downward of the vehicle body, and
    the installation member has a reinforcement surface formed at an inclination angle same as the inclined surface and abutting against the inclined surface from behind.

2. The device protection structure of the vehicle body as claimed in claim 1, wherein the rear end part of the sub-frame comprises left and right extension parts extending rearward of a central part on two sides in a vehicle width direction,
    the slider member comprises: side walls, inclined rearward and downward of the vehicle body on the two sides in the vehicle width direction; a central wall, protruding downward of the side walls at a center in the vehicle width direction; and vertical walls, connecting stepped portions between the side walls and the central wall in the vehicle width direction,
    wherein lower surfaces of the side walls are the inclined surfaces, and
    between a floor part of the vehicle body and the central wall, a cable extending toward the engine room from the protection target device through a central part of the vehicle width direction is arranged.

3. The device protection structure of the vehicle body as claimed in claim 1, wherein the slider member has a bottom protection part extending rearward of the vehicle body from a lower end part of the inclined surface.

4. The device protection structure of the vehicle body as claimed in claim 1, wherein a lower end part of the inclined surface of the slider member extends downward of a lower end part of the protection target device.

5. The device protection structure of the vehicle body as claimed in claim 1, wherein an upper end part of the reinforcement surface is located above an upper surface of the rear end part of the sub-frame, and a lower end part of the reinforcement surface is located lower than a lower surface of the rear end part of the sub-frame.

6. The device protection structure of the vehicle body as claimed in claim 1, wherein the installation member is a solid member.

7. The device protection structure of the vehicle body as claimed in claim 1, comprising:
    a floor frame, having a structure comprising a closed section and extending in the front-rear direction of the vehicle,
    wherein the installation member is installed to the vehicle body via the floor frame.

8. The device protection structure of the vehicle body as claimed in claim 2, wherein the protection target device is a high voltage unit mounted in a vehicle, and
    the cable is a power cable connected to a power source in the engine room from the high voltage unit.

9. The device protection structure of the vehicle body as claimed in claim 2, wherein the slider member has a bottom protection part extending rearward of the vehicle body from a lower end part of the inclined surface.

10. The device protection structure of the vehicle body as claimed in claim 2, wherein a lower end part of the inclined surface of the slider member extends downward of a lower end part of the protection target device.

11. The device protection structure of the vehicle body as claimed in claim 3, wherein the lower end part of the inclined surface of the slider member extends downward of a lower end part of the protection target device.

12. The device protection structure of the vehicle body as claimed in claim 2, wherein an upper end part of the reinforcement surface is located above an upper surface of the rear end part of the sub-frame, and a lower end part of the reinforcement surface is located lower than a lower surface of the rear end part of the sub-frame.

13. The device protection structure of the vehicle body as claimed in claim 3, wherein an upper end part of the reinforcement surface is located above an upper surface of the rear end part of the sub-frame, and a lower end part of the reinforcement surface is located lower than a lower surface of the rear end part of the sub-frame.

14. The device protection structure of the vehicle body as claimed in claim 4, wherein an upper end part of the reinforcement surface is located above an upper surface of the rear end part of the sub-frame, and a lower end part of the reinforcement surface is located lower than a lower surface of the rear end part of the sub-frame.

15. The device protection structure of the vehicle body as claimed in claim 2, wherein the installation member is a solid member.

16. The device protection structure of the vehicle body as claimed in claim 3, wherein the installation member is a solid member.

17. The device protection structure of the vehicle body as claimed in claim 4, wherein the installation member is a solid member.

18. The device protection structure of the vehicle body as claimed in claim 2, comprising:
    a floor frame, having a structure comprising a closed section and extending in the front-rear direction of the vehicle,
    wherein the installation member is installed to the vehicle body via the floor frame.

19. The device protection structure of the vehicle body as claimed in claim 3, comprising:
    a floor frame, having a structure comprising a closed section and extending in the front-rear direction of the vehicle,
    wherein the installation member is installed to the vehicle body via the floor frame.

20. The device protection structure of the vehicle body as claimed in claim 4, comprising:
    a floor frame, having a structure comprising a closed section and extending in the front-rear direction of the vehicle,
    wherein the installation member is installed to the vehicle body via the floor frame.

* * * * *